July 23, 1963    R. MAESTRELLI    3,098,454
AUTOMATIC STEERING SYSTEM FOR VEHICLES SUPPORTED
ON PNEUMATIC TIRED WHEELS
Filed Oct. 4, 1960    3 Sheets-Sheet 1
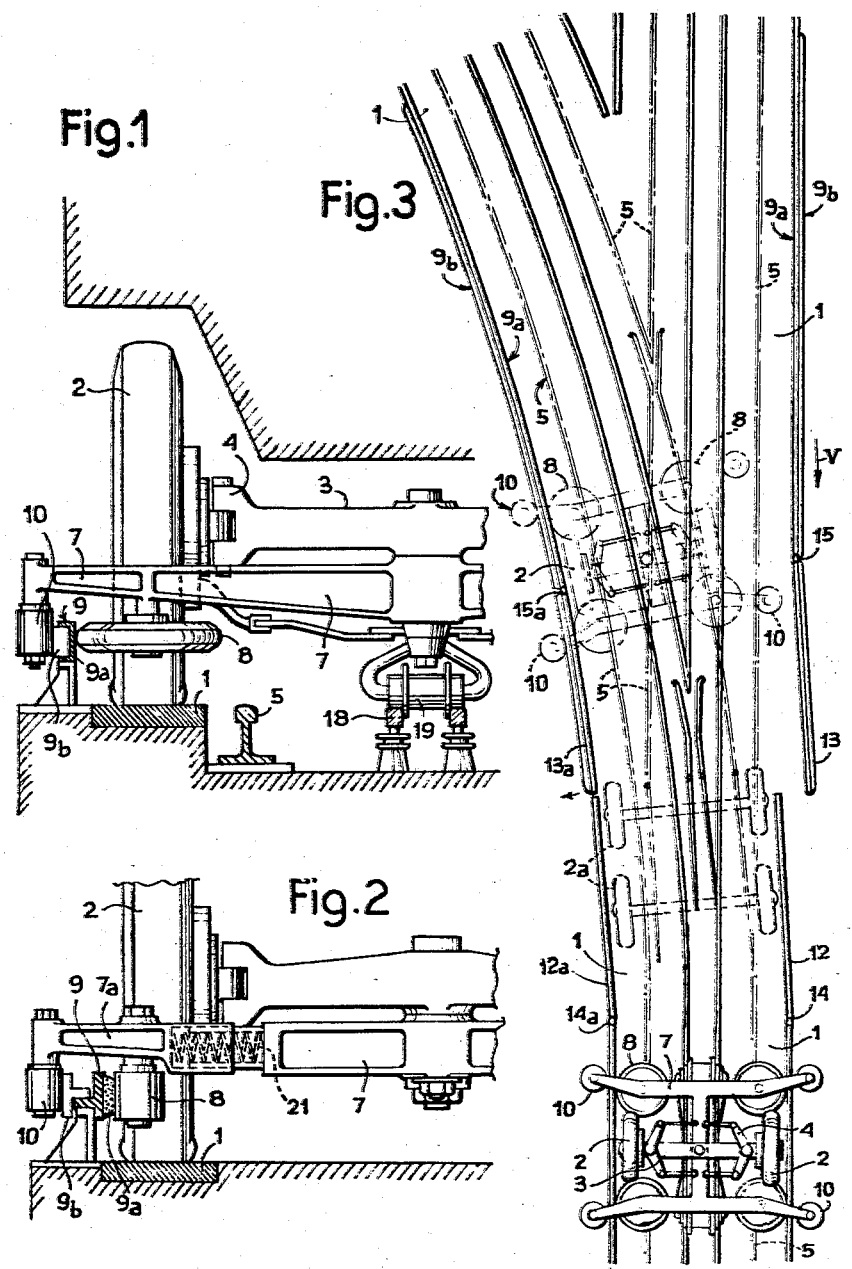
INVENTOR:
RAFFAELLO MAESTRELLI

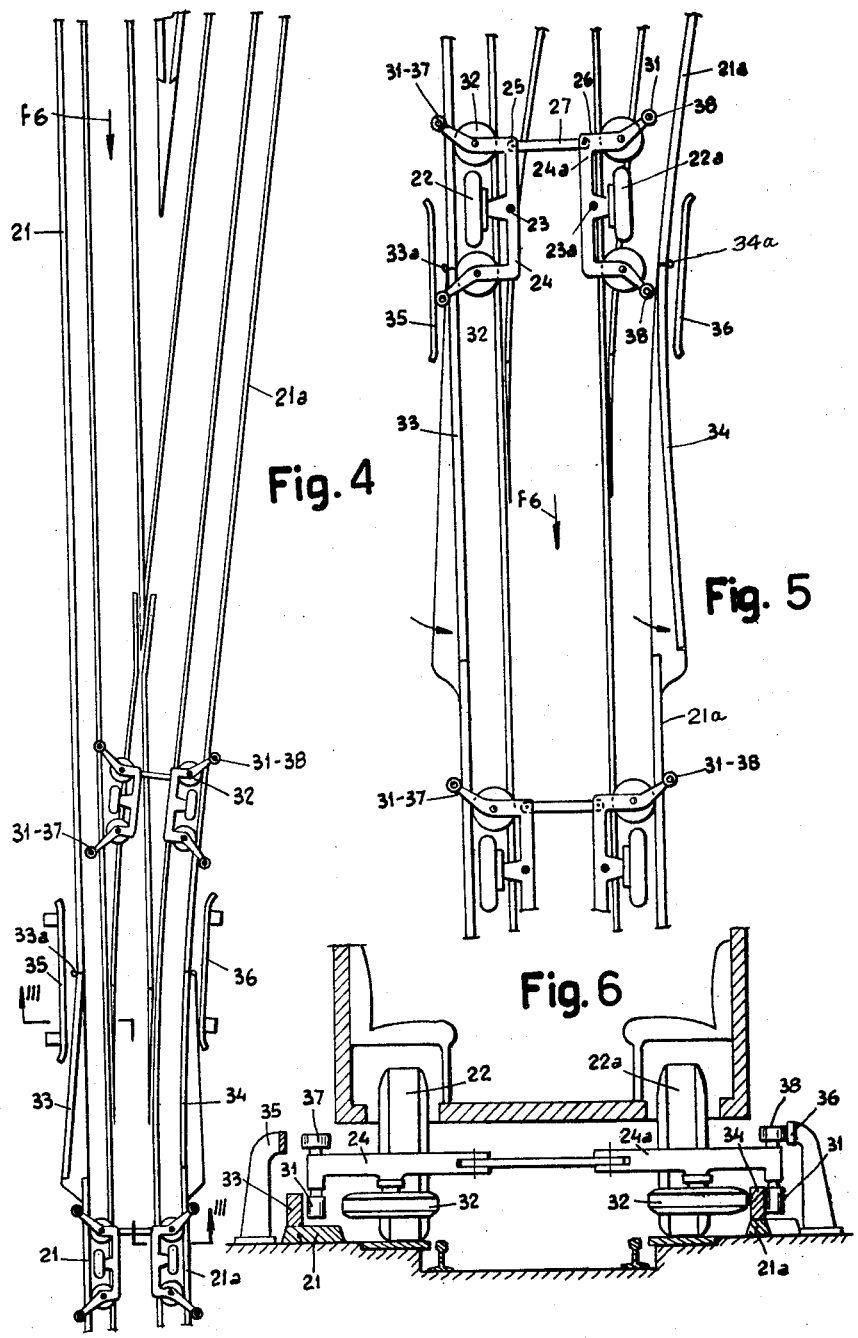

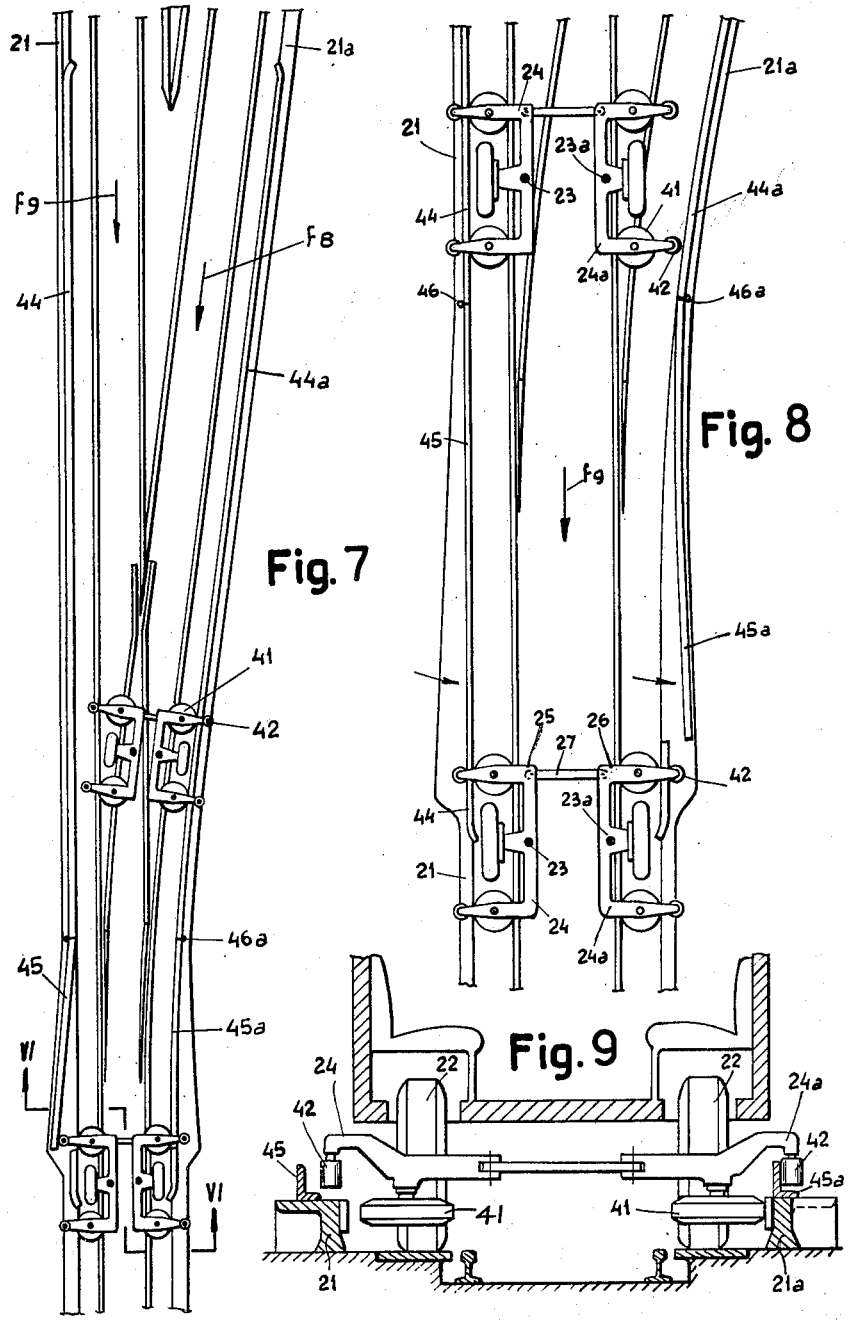

United States Patent Office 3,098,454
Patented July 23, 1963

3,098,454
AUTOMATIC STEERING SYSTEM FOR VEHICLES
SUPPORTED ON PNEUMATIC TIRED WHEELS
Raffaello Maestrelli, Via Carnaghi 2, Milan, Italy
Filed Oct. 4, 1960, Ser. No. 60,408
Claims priority, application Italy Nov. 7, 1959
8 Claims. (Cl. 104—247)

According to the invention there is provided a vehicle steering system comprising two tracks for pneumatic tired vehicle wheels, a lateral guide rail extending above said tracks and arranged on the outer side of said tracks and, in the region of switch points, an additional lateral guide rail opposed to the first-mentioned lateral guide rail and, on each side of the vehicle, steering means comprising wheels or rollers mounted for rotation about vertical axes arranged on the inside and outside of said lateral guide rails to cooperate respectively with said first lateral guide rail and, in the region of the switch points, with said additional lateral guide rail, the arrangement being such that a vehicle passing over the switch points is guided on the lateral guide rails of the outer side of the points.

Again, according to the invention there is provided a vehicle steering system comprising two tracks for pairs of pneumatic tired vehicle wheels and means for steering a pair of said wheels at least in the region of switch points at the convergence of two branch lines into a single line, said means comprising guide rails extending along the outside of the tracks, each guide rail on the outer side of the points having a movable section, the sections being pivotally movable between a first position in which they complete a guide rail between one branch line and the single line and a second position in which they complete a guide rail between the other branch line and the single line, and a pair of guide wheels on each side of the vehicle rotatable about substantially vertical axes, an inner wheel of each pair being arranged to contact an inner surface of a guide rail, and an outer wheel of said pair being arranged to contact an outer surface of the guide rail over said movable section, the arrangement being such that if the switch points are not positioned to complete a guide rail for a vehicle approaching the switch points, the guide rail sections are moved by said outer wheel to complete said guide rail. The invention will now be particularly described by way of example only with reference to the accompanying drawings in which:

FIGURE 1 is a fragmentary elevational view in vertical transverse section of a steering system for a vehicle including three steering devices;

FIGURE 2 is a view similar to FIGURE 1 but showing a modification having two steering devices;

FIGURE 3 is a diagrammatic plan view of switch points at the junction of a direct line and a branch line showing a vehicle passing over the points;

FIGURE 4 is a diagrammatic plan view of modified switch points;

FIGURE 5 is an enlarged detail plan view of the switch points of FIGURE 4 but in which the points have been switched over;

FIGURE 6 is an elevational view in transverse section through a vehicle passing over the points of FIGURE 4;

FIGURES 7, 8 and 9 are views respectively corresponding to those of FIGURES 4, 5 and 6, of a further embodiment of the invention.

As shown in FIGURES 1 and 3, two tracks 1 are provided for the pneumatic tired wheels 2 of a vehicle, these wheels being supported on an axle 3 by means of a pivot linkage 4.

As also shown in FIGURE 1, conventional rails 5 are also provided for vehicles with steel flanged wheels, the present system thus allowing the use of both types of vehicle, that is; vehicles with conventional steel flanged wheels and vehicles with pneumatic tired wheels.

In FIGURE 3 the vehicle is shown diagrammatically with the carriage removed and with pairs of wheels 2 at its opposite ends, both pairs of wheels being orientatable for steering as mentioned above. In addition, an intermediate driving pair of pneumatic tired non-orientatable wheels 2a may be provided. In this case, the tracks 1 will be appropriately dimensioned with regard to the length of the vehicle, the gauge of the wheels 2a and the radius of curvature of the tracks at bends therein, to insure that all of the wheels engage the tracks.

As shown in FIGURES 1 and 3, steering equipment including structure 7 is provided in combination with each pair of wheels 2. This equipment comprises four wheels or rollers 8 each of a relatively large diameter and each of which may be pneumatic tired, mounted for rotation about vertical axes, the outer periphery of the wheels 8 engaging a vertical steering surface 9a on rails 9 arranged outwardly of the track 1. The surfaces 9a on opposite rails face toward one another. If steering is entrusted to the wheels 8 alone, these will make continuous contact with the rail surfaces 9a. If, on the other hand, central steering equipment as shown and hereinafter described, the wheels 8 will engage only the rail surfaces 9a when the vehicle is displaced laterally with respect to the rails 1 as, for example, under centrifugal force.

The structure 7 also carries rollers 10 outwardly of the rails 9, the rollers 10 likewise being rotatable about vertical axes. The rollers 10 are spaced outwardly from the rails 9 but in the region of switch points outer guides 9b are provided on the rails 9 for engagement with the rollers 10.

The steering system comprising the rollers 8 and 10 serves to steer a vehicle over the switch points.

In order to effect a change over of the switch points, the structure formed by the rails 9 and guides 9b include sections 12 and 13 pivoted at their outer ends 14 and 15 to the adjacent fixed part of the structure, their inner ends lying adjacent one another, all as shown in FIGURE 3. The two sections 12 and 13 are movable from an aligned position permitting the movement of traffic along the straight track in FIGURE 3 to a displaced position causing movement of traffic along the branch track in FIGURE 3. Two corresponding sections 12a and 13a are pivotally mounted at 14a and 15a on the opposite sides of the track, the sections 12 and 12a and 13 and 13a respectively being maintained by conventional mechanical means (not shown) parallel to one another. Thus, when the sections 12a and 13a are aligned as shown, the misalignment of the sections 12 and 13 allows the rollers 10 opposite to those engaging the sections 12a and 13a to pass between the sections 12 and 13.

It is to be noted that when the switch points are positioned as shown in FIGURE 3 and a vehicle arrives in the direction of the arrow V, the section 13 is stressed by a roller 10 of the vehicle into alignment with the straight track to permit the vehicle to pass over the switch points. The stress may be applied directly or through servo motors in conventional manner to move the sections 12 and 13 into alignment and correspondingly to move the sections 12a and 13a out of alignment. Thus a safety measure is provided in the event of movement of vehicles accidentally against the setting of the switch points.

The central steering equipment cooperates with a pair of central rails 18 between the conventional rails 5, the switch over points being provided with movable interconnecting switch rails for the rails 18 in known manner, as shown in FIGURE 3 thus, as shown in FIGURE 1, a pair of rails 18 is provided which, in addition to carrying a power supply, forms part of the central steering equipment. Cooperating with these rails is a roller 19 or, alternatively two separate rollers, and the steering of the wheels 2 may be controlled by the cooperation of roller 19 and rails 18. In this case there may be play between the wheels 8 and rollers 10 and the rails 9 over straight portions of the track; and the wheels 8, and at the switch points the rollers 10 will only engage the tracks to apply a correction to the guidance of the vehicle or to change the setting of the switch points.

In FIGURE 2, the steering means 18 and 19 and the rails 5 are omitted but the other parts (which are the same or equivalent to those shown in FIGURES 1 and 3) are indicated by the same reference numerals used in FIGURES 1 and 3. In this embodiment of the invention, the members 8 are formed as rollers which cooperate with a rubber lining surface 9a on the rails 9 and, at the switch points, modified guides 9b are provided. In this embodiment, the rollers 8 effect the steering of the vehicle and also keep the vehicle within the rails 9 and, at the switch points, cooperate with the rollers 10 in the manner described in relation to FIGURE 1. In order to allow for transverse deformation of the tires of the wheels 2, the structure 7 supports the rollers 8 resiliently by the interposition of a spring 21 between the structure 7 and a member 7a to which each roller 8 is attached, the member 7a sliding transversely in a guide in the structure 7.

In this case, the lateral thrust on the structure is damped by the resilience of the tires and that of the spring 21 as distinct from the embodiment in FIGURE 1 in which the lateral thrust is damped out by the resilient deformation of the wheels 8 and the tires of wheels 2. In either case, play between the rails 9 and rollers 10 will not separate the contact between the rollers 10 and rails 9 even with large transverse movement of the vehicle with respect to the tracks 1.

With reference to the embodiments represented in FIGURES 5 and 8, the track which the tires engage are flanked by steering rails 21 functionally equivalent to the rails 9 of FIGURE 1. The pneumatic tired wheels 22 and 22a are mounted on supports 24 and 24a and these supports are pivotable about vertical pivots 23 and 23a to permit the wheels to be steered. A bar 27 is connected by pivots 25 and 26 at opposite ends thereof to the supports 24 and 24a at one end thereof. The length of the bar 27 may be adjusted by conventional adjusting means (not shown) at 25 and 26 so that the spacing and inclination of the lines joining parts 23 and 25, and 23a and 26 may be appropriately adjusted.

As shown in FIGURES 4 to 6, inclusive, the supports 24 and 24a carry at their opposite ends wheels 32 and rollers 31 which are the equivalent of the wheels 8 and rollers 10 of FIGURE 1.

At the switch points movable parts 33 and 34 of the rails 21 and 21a are pivoted to the latter at 33a and 34a and counterrails 35 and 36 are arranged parallel to and above the rails 21 and 21a, being spaced outwardly therefrom. At opposite ends, the counter rails 35 and 36 are outwardly bent. Also mounted on the supports 24 and 24a are rollers 31 similar to the rollers 10 of FIGURE 1 for engaging the outside of the tracks 21 and 21a and rollers 37 and 38 coaxial with rollers 31 for engaging the counterrails 35 and 36.

In the operation of the switch points wherein, for example, the section 34 completes the rail 21a, the rollers 31 on the opposite side of the vehicle from the rail 21a pass through a space thus left between the deflected section 33 and the fixed portion of the track 21. If a vehicle comes from the direction of the arrow $f_6$ in FIGURE 4 with the switch points in the position shown, the leading rollers 37 adjacent the rail 21 passes into the space between the rail 21 and a rigidly mounted counter-rail 35 and thus forcibly moves the section 33 from the position of FIGURE 4 into the position of FIGURE 5 to insure the continuity of the track 21.

Similarly, when the switch points are in the position of FIGURE 5 and a vehicle approaches the points along the right hand branch line as seen in the drawings, which normally would result in derailment, the leading roller 38 cooperates with a rigidly mounted counter-rail 36 to forcibly move the section 34 into alignment with the track 21a to permit the vehicle to pass safely over the switch points.

In FIGURES 7 to 9, inclusive, inner steering wheels 41 cooperate with the steering rails 21 and 21a and supports 24 and 24a are each provided with single outer rollers 42 located above wheels 41. At the switch points, rail sections 44 and 44a are provided which cooperate with the rollers 42. These rail sections are located higher than the rails 21 and 21a and support movable rail sections 45 and 45a pivoted at 46 and 46a, respectively. The rollers 42 engage the outer surfaces of the rail sections 45 and 45a to move them appropriately to permit safe passage of the vehicle over the points.

When a vehicle travels in the direction of the arrow $f_8$ of FIGURE 7, or the reverse, and the movable section 45a is aligned with the rail 21a, safe passage of the vehicle is assured. However, should a vehicle come in the direction of the arrow $f_9$ of FIGURES 7 and 8 with the switch points arranged as in FIGURE 7, the leading roller adjacent the rail 21 engages the movable section 45 and moves the switch points from the position of the FIGURE 7 to the position of FIGURE 8 and prevents the roller 41 adjacent the section 45 from moving away from the steering rail 21.

Similarly when the switch points are arranged as in FIGURE 8 and a vehicle arrives in the direction of the arrow $f_8$, the leading roller 42 adjacent the section 45a engages this section and moves the switch points from the position of FIGURE 8 into the position of FIGURE 7.

What I claim is:
1. A vehicle steering system comprising two tracks for pneumatic tired drive wheels of a vehicle, a lateral guide rail extending above said tracks and arranged on the outside of said tracks, and in the region of switch points, an additional lateral guide rail opposed to the former, and on each side of the vehicle, steering means comprising wheels or rollers mounted for rotation about vertical axes arranged on the inside and outside of said lateral guide rails to cooperate respectively with said first lateral guide rail, and, in the region of the points with said additional lateral guide rail, the arrangement being such that the vehicle passing over the points is guided on the lateral guide rails of the outer side of the points.

2. A vehicle steering system comprising two tracks for pairs of pneumatic tired wheels of a vehicle and means for steering a pair of said wheels at least in the region of switch points at the convergence of two branch lines into a single line, said means comprising guide rails extending along the outside of the tracks, each guide rail on the outer side of the points having a movable section, the section being pivotally movable between a first position in which they complete a guide rail between one branch line and the single line and a second position in which they complete a guide rail between the other branch line and the single line, and a pair of guide wheels on each side of the vehicle rotatable about substantially vertical axes, an inner wheel of each pair being arranged to contact an inner surface of a guide rail, and an outer wheel of said pair being arranged to contact an outer surface of the guide rail over said movable section, the arrangement benig such that if the points are not positioned to complete a guide rail for a vehicle approaching the points, the guide rail sections are moved by said outer wheel to complete said guide rail.

3. A steering system according to claim 2, wherein, at the switch points, when one guide rail is completed, the other guide rail is broken to allow the pair of guide wheels on the opposite side of the vehicle from the completed guide rail to engage their corresponding guide rail on the single line side of the points.

4. A steering system according to claim 3, wherein there is some play between said inner and outer wheels and their associated guide rails to allow for lateral deformation of the tyres of said pneumatic tired wheels.

5. A steering system according to claim 4, wherein each pneumatic tired wheel is mounted on a support which is pivotally movable about a vertical axis, said supports being elongated in the direction of movement of the vehicle and the supports of each adjacent pair being pivotally interconnected at one end by a cross bar.

6. A steering system according to claim 2, wherein, adjacent the pivotal connection of each extension with a guide rail, a fixed counter-rail is positioned for engagement with a further guide wheel, said further guide wheel serving to control the movement of said outer guide wheel to effect any necessary movement of the switch points.

7. A steering system according to claim 2, wherein the outer guide wheels are located in a position above that of the inner guide wheels to cooperate in the region of the points with the outer surface of lengths of guide rail extending above the guide rail engaged by inner steering wheels said lengths of guide rail forming said movable sections.

8. A vehicle steering system comprising two tracks for pneumatic tired drive wheels of a vehicle, a lateral guide rail extending above said tracks and arranged on the outside of said tracks and in the region of switch points, an additional lateral guide rail opposed to the former and on each side of the vehicle, steering means comprising wheels or rollers mounted for rotation about vertical axes arranged on the inside and outside of said lateral guide rails to cooperate respectively with said first lateral guide rails and, in the region of the points, with said additional lateral guide rail, the arrangement being such that a vehicle passing over the points is guided on the lateral guide rails of the outer side of the points, said lateral guide rails having pivotally movable sections, and means for effecting the movement of a movable section of the additional lateral guide rail by the movement of a movable section of the lateral guide rail, whereby to allow the passage of the outer wheels or rollers on that side of the vehicle to that side adjacent a continuous guide rail.

References Cited in the file of this patent

UNITED STATES PATENTS

| | | |
|---|---|---|
| 2,101,024 | Heinze | Dec. 7, 1937 |
| 2,718,194 | Ruhlman | Sept. 20, 1955 |

FOREIGN PATENTS

| | | |
|---|---|---|
| 499,694 | Great Britain | Jan. 27, 1939 |